US005768374A

United States Patent [19]

Poulsen

[11] Patent Number: 5,768,374

[45] Date of Patent: Jun. 16, 1998

[54] APPARATUS AND METHOD FOR CONTINUOUS SCRAMBLING WHILE TRANSMITTING OR RECEIVING SYNCHRONIZATION DATA

[75] Inventor: Steven P. Poulsen, Lincoln, Nebr.

[73] Assignee: Transcrypt International, Lincoln, Nebr.

[21] Appl. No.: 689,214

[22] Filed: Aug. 6, 1996

[51] Int. Cl.$^{6}$ .......... H04L 9/00

[52] U.S. Cl. .......... 380/9; 380/38; 380/49; 380/59

[58] Field of Search .......... 380/9, 20, 28, 380/48, 49, 59, 38, 39

[56] References Cited

U.S. PATENT DOCUMENTS

| | | | |
|---|---|---|---|
| 4,052,565 | 10/1977 | Baxter et al. . | |
| 4,152,650 | 5/1979 | Bennett, Jr. | 380/48 X |
| 4,169,993 | 10/1979 | Taylor et al. . | |
| 4,172,963 | 10/1979 | Belcher et al. | 380/48 |
| 4,208,544 | 6/1980 | Burke, Jr. | 380/48 |
| 4,893,339 | 1/1990 | Bright et al. . | |
| 4,893,341 | 1/1990 | Gehring . | |
| 5,185,796 | 2/1993 | Wilson | 380/48 X |
| 5,243,650 | 9/1993 | Roth et al. . | |
| 5,278,907 | 1/1994 | Snyder et al. . | |
| 5,359,624 | 10/1994 | Lee et al. . | |

*Primary Examiner*—Bernarr E. Gregory
*Attorney, Agent, or Firm*—Zarley, McKee, Thomte, Voorhees, & Sease

[57] ABSTRACT

An apparatus and device for continuously scrambling audio while transmitting or receiving synchronization data. When transmitting, synchronization data will be substituted for scrambled audio but the audio scrambling will continue during those time periods so that once the substituted synchronization data is stopped, the scrambled audio will pick up at a point correlated to the then existing condition of a time dependent scrambling algorithm. The receiver will descramble the scrambled audio but will replay past scrambled audio to replace portions in the received signal that would be otherwise occupied by the synchronization data. In this manner, the quality of received audio is enhanced.

27 Claims, 3 Drawing Sheets

APPARATUS AND METHOD FOR CONTINUOUS SCRAMBLING WHILE TRANSMITTING OR RECEIVING SYNCHRONIZATION DATA

BACKGROUND OF THE INVENTION

A. Field of the Invention

The present invention relates to radio transceivers, and in particular to scrambling and descrambling audio transmissions with radio transceivers, and more particularly to continuously scrambling and descrambling while transmitting or receiving synchronization data.

B. Problems in the Art

There are many instances where security and confidentiality is desired in radio transmissions. Examples are law enforcement, military activities, or similar tactically related functions. However, confidentiality is desired in certain instances by business networks or enterprises, which seek to have confidential communications with company members while enjoying the advantages of radio communication as opposed to, for example, telephone communication with its associated transmission charges.

The methods and devices to accomplish scrambling of this type are many and diverse. One example can be found at U.S. Pat. No. 5,278,907, to Snyder et al., commonly owned with the owner of the present invention. The Snyder et al. patent discloses a method of scrambling an analog audio signal using time varying pseudo random spectral modification. This method uses an algorithm to instruct time dependent switching of frequencies and modifications of the frequency spectrum of the transmitted audio. The transmitting and receiving devices must have the same algorithm and must be synchronized over each very small moment in time for the communications to effectively operate. In other words, the transmitting device and receiving device must be at the same point of the algorithm for the same piece of transmitted information for successful descrambling to occur.

As is well known in the art, this type of scrambling is so fast, in its modifications of the original audio signal, that it occurs in time frames on the order of milliseconds or fractions thereof. Therefore, the algorithm, which is literally manipulating the original analog audio waveform from moment to moment, is doing so most times in less than the amount of time of a spoken syllable.

While many of these time dependent scrambling methods work well, including that of Snyder et al., most require that data be included in the transmission and contain, for example, synchronization information for the receiver to synchronize to the transmitter, or more precisely, to synchronize to the scrambled transmission. This synchronization information can be incorporated in the transmitted radio waveform (an analog wave). A significant problem in this art is to remove and process the synchronization data with minimum degrading of the audio part of the transmission.

A conventional method of sending data and audio is to have two independent sections in the transmitter. One processes the audio (the voice of the transceiver user) into a form that can be transmitted by radio. The other section generates and inserts synchronization data into the signal created by the audio portion of the system. The audio portion scrambles the audio or speech according to the time dependent scrambling method and algorithm. The receiver therefore must not only descramble the audio, but also must extract the synchronization data. Without accurately extracting the synchronization data, the very fast types of scrambling algorithms would not be followed and the audio would be degraded or unintelligible.

One way to handle this is to put the data into small packets or bursts that are periodically introduced into the scrambled audio that is transmitted. The receiver would extract those small bursts using a demodulator (the bursts being data modulated on a carrier waveform that can be periodically inserted into the audio waveform). The data is then used to synchronize the receiver with the transmitter and the scrambled audio is taken to a separate section of the receiver and the synchronized scrambling algorithm allows descrambling.

It has been determined that the known types of analog scrambling and descrambling, with separate sections for scrambling and synchronized data generation and extraction, could advantageously be implemented in transceivers utilizing digital signal processors. However, the use of such scrambling methods cannot be implemented using a digital signal processor without overcoming several significant problems.

First, the digital signal processor (DSP) must do multiple tasks. For example, it must not only scramble and descramble audio, but also must be involved most times in generation of the synchronization data in a transmitting mode, as well as extracting that data in a receiving mode. Many times the DSP is also involved is still further tasks, such as are known in the art. Implementation with the DSP therefore loses the advantages of independent separate sections for audio processing and synchronized data processing as described previously.

Secondly, if the DSP must be periodically interrupted to handle and process the synchronization data, there is not only a loss of audio during that time, but also, once descrambling is restarted, if restarted at the point where it left off, the device may lose its correlation to the scrambling algorithm, which is time dependent. In other words, even though very short times are involved in processing synchronization data, if processing of the audio information is essentially put on hold until synchronized data is processed, the scrambling algorithm continues its time varying operation during processing of the synchronization data, and therefore would lose correlation to the precise audio information which existed when the audio information was encoded or scrambled.

Without overcoming these problems, implementation of these types of scrambling methods in a DSP may result in unacceptable audio quality or performance.

There is therefore a real need in the art to overcome the problems of implementing the scrambling techniques in a DSP. It is therefore a principle object of the present invention to provide an apparatus and method for continuous scrambling while transmitting or receiving synchronization data when implemented with a DSP.

It is a further object of the present invention to provide an apparatus and method as above-described which overcomes or solves the problems and deficiencies in the art.

A further object of the present invention is to provide an apparatus and method as above-described which maintains or improves audio quality over existing scrambling methods.

A still further object of the present invention is to provide an apparatus and method as above-described which allows accurate and timely processing of synchronization data while maintaining correlation with the appropriate audio information during scrambling in the transmitting mode of the signal, and during descrambling in the receiving mode.

These and other objects, features, and advantages of the present invention will become more apparent with reference to the accompanying specification and claims.

SUMMARY OF THE INVENTION

The present invention allows implementation of time dependent scrambling techniques with a digital signal processor. The method involves, in the transmission phase, periodically interrupting scrambling of a sampled audio signal to replace the audio signal with modulated digital synchronization data. During that interruption, however, scrambling of the audio continues and furthermore, at the end of the interruption, the scrambled audio is reinserted in the transmitted signal. However, the reinserted scrambled audio is that audio which is correlated to that particular time in the scrambling methodology, and the audio which was continuously scrambled during the interruption is ignored. Therefore, the transmitted signal, though including interruptions of synchronization data, on a time scale will correlate the audio information with each moment of the scrambling algorithm.

This is possible because the interruptions are on a time scale so small that they will not eliminate information needed to understand speech. The digital signal processor can therefore, in a transmitting mode, multitask both the scrambling of the audio and the generation, modulation, and insertion of synchronization data into the interruptions that will periodically occur in the ultimate transmission.

On the receiving side, the method uses the time dependent scrambling algorithm to descramble the received transmission, which in this case will include both scrambled audio and the digital synchronization information. In order that the unintelligible descrambled digital synchronization data is not passed to the output of the receiving portion of the transceiver, which may significantly degrade the audio quality, there is a periodic checking for the presence of synchronization data in the received signal. During those periodic checks, the received audio/digital data scrambled signal is sent in a separate signal pathway where the synchronization data is extracted and utilized by the scrambling algorithm for synchronization. Also, during those checks, the descrambled audio from a time prior to the checking period is stored and replayed to the output. Once the checking period is completed, the replayed audio is discontinued and descrambled audio is picked up at that point in time and passed to output. Essentially, during the checking period, what otherwise would be unintelligible incorrectly descrambled digital data at the receiver output is replaced with previous descrambled audio that has been stored. Again, as these time periods are very small, the replayed audio is generally less than a syllable of speech and therefore fills in the gaps during the receiver's extraction of digital synchronization data.

In the method, there may be a need for timing adjustments to ensure that only approximately the synchronization time periods are covered by the replayed descrambled audio and that the replaying of stored audio does not greatly exceed the length of the data burst.

The apparatus according to the invention utilizes a digital signal processor to sample an audio signal and uses a scrambling algorithm to scramble that sampled audio signal. Pre- and post-scrambling filters can be used for conditioning of the signal. The scrambling algorithm can cooperate with the DSP to operate a numerically controlled oscillator, in the case of the scrambling algorithm utilizing inversion frequency techniques. A modulator can be used to incorporate the digital synchronization data into the scrambled audio, and a switch is used to interrupt the signal path of the scrambled audio and insert the modulated synchronization data prior to output from the transmitter.

The receiver utilizes similar structure in addition to a demodulator placed in a second signal path. Received combined scrambled audio and modulated digital synchronization data are then sent down a first signal path through a scrambler to descramble the signal, and a second path that is open and closed by a switching device. A control device associated with digital signal processor instructs the receiver to look for synchronization data and makes conducting the second signal path for a time approximately equal to the period of one packet or burst of digital synchronization data. At the same time, a replay device or buffer, which has previously been instructed to store descrambled audio, plays back that descrambled audio to the receiver output. At the end of the checking time for synchronization data, the control device signals the replay device to stop replaying stored descrambled audio, and instead passes descrambled audio to the output that matches up in time to the time-dependent scrambling method. A timing delay device or devices can be utilized in hardware or software to match the timing of the various components' operation to in turn match the replay with what otherwise would be a gap or period of incorrectly descrambled synchronization data at the output of the receiver.

DETAILED DESCRIPTION OF THE PREFERRED EMBODIMENT

Figure 1:
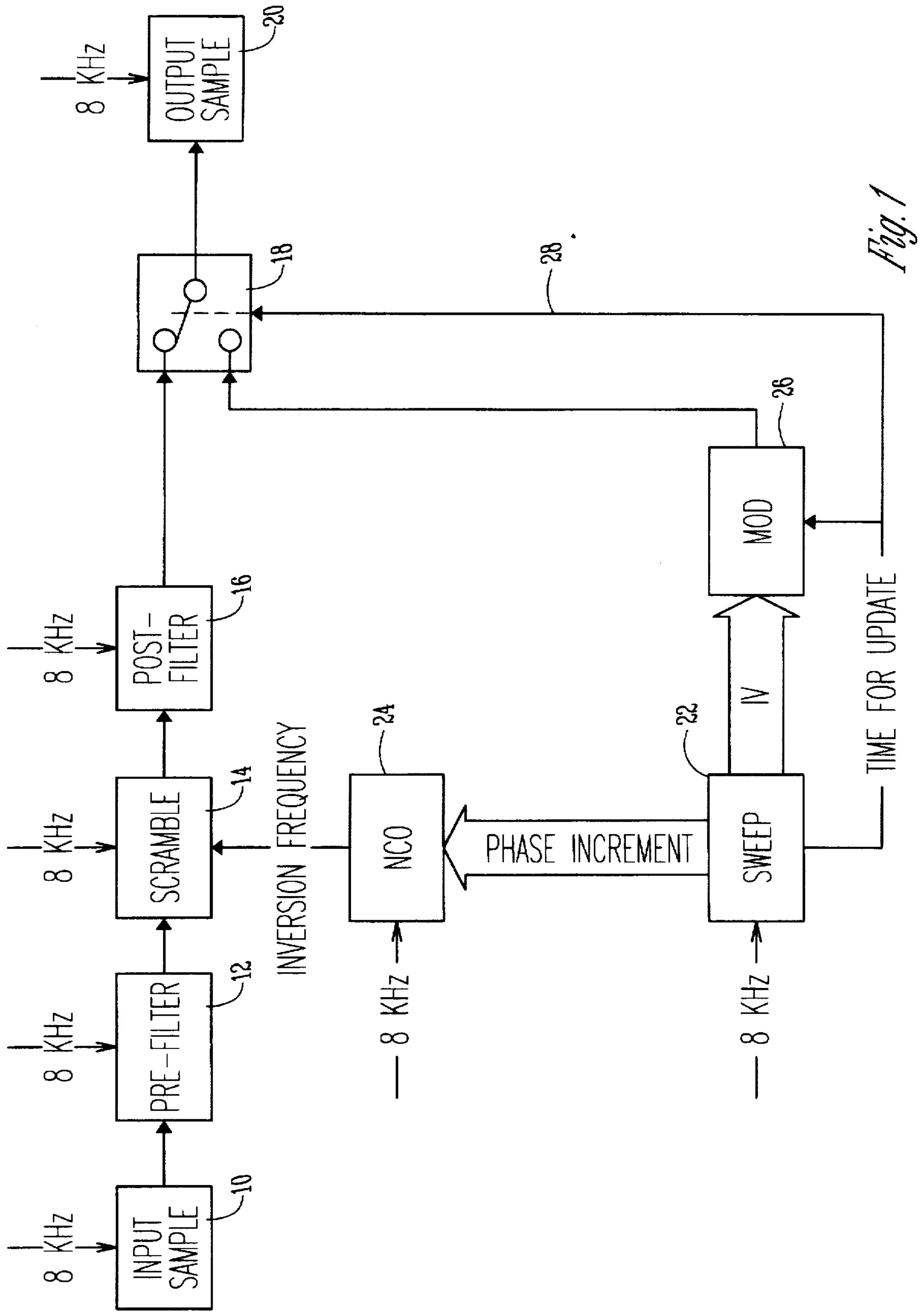
FIG. 1 is a schematic diagram of a transmitter apparatus according to a preferred embodiment of the invention.

To attempt to provide more understanding of the present invention, one embodiment will now be described in detail. Certain parts and location in the drawings will be identified with reference numerals.

Figure 2:
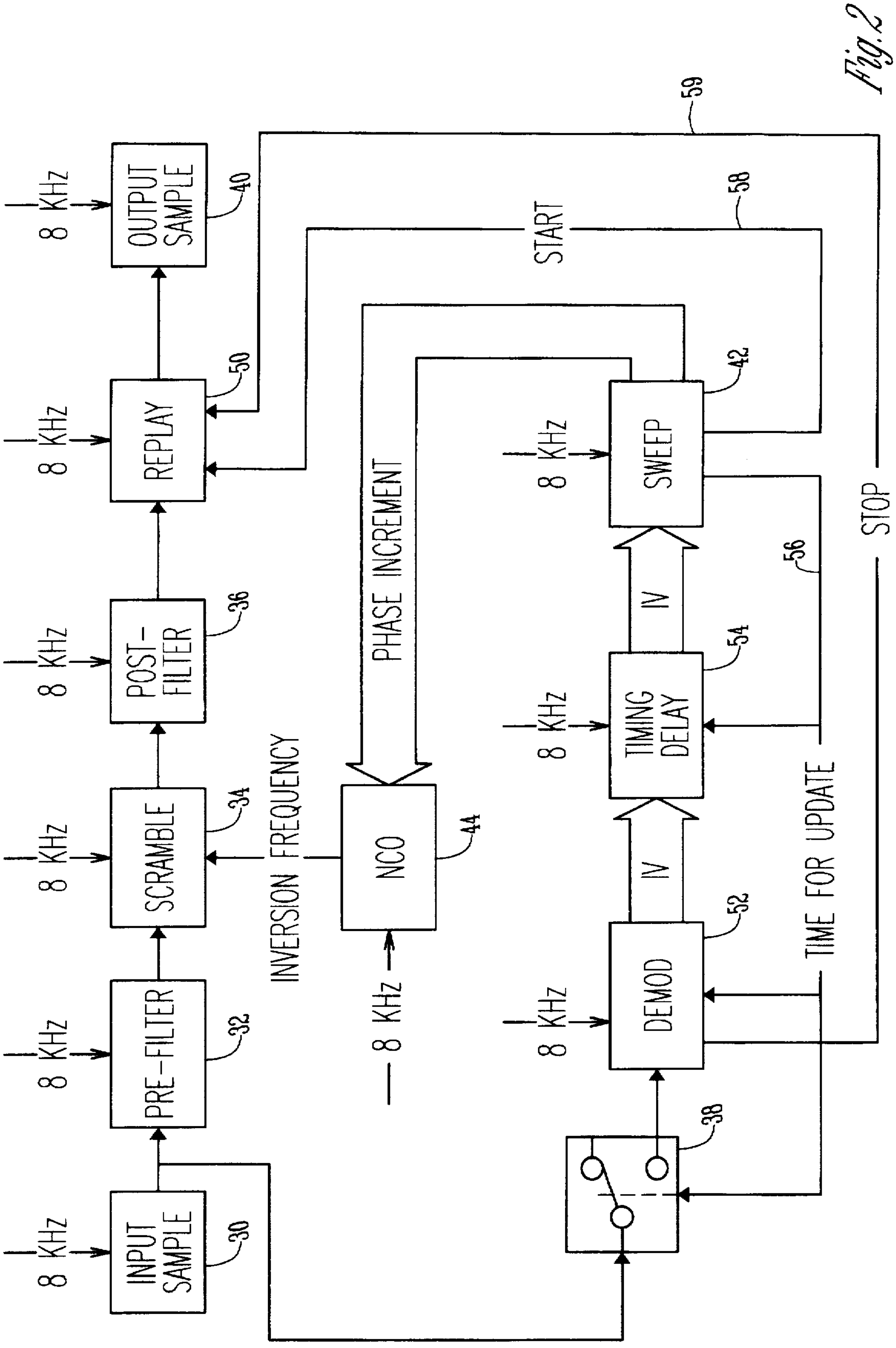
FIG. 2 is a schematic diagram of a receiver section according to a preferred embodiment of the present invention.

It is to be understood that FIGS. 1 and 2 illustrate schematically a transmitter apparatus and a receiver apparatus respectively according to the present invention. The precise circuitry for the elements of the schematic is not shown as it is well known within those skilled in the art. It is further to be understood that the apparatus could be implemented substantially in software using a digital signal processor and related components, such as is well known to those skilled in the art. Certain components shown in FIGS. 1 and 2 could also be hardware or firmware based. Variations obvious to those skilled are the art are possible, such as is within the knowledge and skill of those in the art.

Still further, it is to be understood that generally the apparatus of FIGS. 1 and 2 will both be included in a single transceiver so that radio communications of the type described can be both transmitted and received by a single transceiver. As is well known to those skilled in the art, therefore, certain of the individual components or functional equivalents disclosed in FIGS. 1 and 2 can be used both for transmission and receiving to reduce the cost and complexity of the transceiver.

Referring now to FIG. 1, a transmitter circuit according to the present invention can include an input sample device 10. Device 10 would sample an audio waveform at 8 kHz (or at some other established sampling rate) to essentially digitize that otherwise complex and continuous analog waveform. A pre-filter 12, also operating at 8 kHz, is utilized for purposes that are dependent upon the method of scrambling used. Scrambling device 14, operating at 8 kHz, in this embodiment utilizes an inversion frequency method of scrambling to encode or scramble the sampled and pre-filtered audio signal. Post filter 16 reduces the scrambling side effects, such as are known in the art. What will be called output switch 18 is connected in-between post-filter 16 and an output sampling device 20 operating at 8 kHz.

It is to be understood that for purposes of this description the individual blocks 10, 12, 14, 16, 18, and 20 are called devices or components, but can be functions implemented in firmware or software, as can the other functional blocks in FIGS. 1 and 2.

FIG. 1 therefore shows that one signal path for the transmitter is a sampled audio input through scrambler device 14 and pre- and post-filters 12 and 16, through switch 18 to output sampler 20, where it would then pass to processing circuitry to transmit the scrambled signal by radio transmission.

Reference numeral 22 indicates what will be called sweep routine 22. T his routine, normally implemented in software in a digital signal processor, utilizes a pseudo random sweep routine to (a) determine what the current inversion frequency is and pass this to numerically controlled oscillator (NCO) 24 in the form of a phase increment, such as is known in the art (the NCO 24 generates an 8 kHz sampled frequency based on the phase increment input); and (b) generates an initialization vector (IV) to completely describe the pseudo randomness of sweep routine 22 and passes the initialization vector IV to modulator 26, but only at the time a synchronization data packet is to be transmitted.

A control line 28 (in FIG. 1 labeled "Time for Update"), extends from sweep routine 22 to modulator 26 and switch 18. Output switch 18 allows either the scrambled audio sample or synchronization data to be passed to audio output 20. The sweep routine decides when a data packet is to be inserted into the transmission. It sends an instruction over control line 28 to both modulator 26 and output switch 18 so that the digital data is modulated. Simultaneously switch 18 operates to break the signal pathway between post-filter 16 and output sample 20 and establish a signal pathway between modulator 26 and output sample 20. Therefore, modulated initialization vector IV is inserted into the transmitted signal. Upon completion of the data packet, switch 18 is returned to the position shown in FIG. 1 and scrambled audio is presented to output sample 20.

It is important to understand that even during the insertion of each data packet into the transmitted signal, the scrambling blocks 10, 12, 14, 16, 24, and 22 continue to execute at an 8 kHz rate. Therefore, although the transmitted signal will have discrete time periods of synchronization data that will essentially take chunks out of that continuous scrambled audio output signal that is correlated to the pseudo random time dependent scrambling algorithm, the scrambling does not stop, nor is the sample of audio information somehow stalled or held up during the time of the data packets.

Therefore, complete and accurate time dependent correlation is maintained between each discrete moment of scrambled audio that is sent to output sampler 20. Stated a different way, the portions of the transmitted signal filled up by the data packet basically are substituted for what otherwise would be scrambled audio. Those sections of scrambled audio are basically discarded (or not used). As previously stated, this can happen because the data packets take no longer than less than a syllable of speech and therefore the speech is not degraded to a level where it is not intelligible.

FIG. 2 illustrates a receiving circuit according to the invention. Like the transmitting section, the receiving section includes an input sampler device 30, pre-filter 32, scrambling device 34, post-filter 36, output sampler 40, NCO 44 and sweep routine 42. A switch 38 is also utilized. The major difference in FIG. 2 is that a replay device 50 is inserted between post-filter 36 and output sampler 40 (as opposed to switch 18 in FIG. 1). Switch 38 is inserted along a parallel signal pathway after input sampler 30, and controls the sending of the input signal to this receiving section to a demodulator 52 and timing delay device 54, which then communicates with sweep routine 42.

The received signal at input sample 30 is sampled at an 8 kHz rate. The signal is then passed to pre-filter 32. Like pre-filter 12, pre-filter 32 is dependent on the scrambling method and then passes the signal to scrambling routine 34 where it is descrambled based on the current inversion frequency. Thereafter the scrambled signal is sent to post-filter 36, which like post-filter 16 reduces scrambling side effects. The sample at this point in the circuit is either correctly descrambled audio or incorrectly descrambled data because the received signal contains both audio and the bursts of synchronization data.

In FIG. 2, the sample is then passed to replay device 50 whose purpose is to buffer up enough samples and replay them when synchronization data is presented as an input. Replay device 50 will buffer up input samples and pass them through to output sample device 40 when the samples are descrambled audio. On the other hand, when the samples are incorrectly descrambled data, replay device 50 will replay past samples of audio to output sampler 40.

Sweep routine 42 is continuously executing at the 8 kHz sample rate. It provides NCO 44 with a pseudo random phase increment which is synchronized with that of the transmitter circuit. Sweep routine 44 also decides when it is time to receive data (update) and provides this as an output along line 56 to switch 38, demodulator 52, and timing delay 54. It also presents a "start" instruction along line 58 to replay device 50. When the start instruction is sent, input switch 38 changes state based on the decision of sweep routine 42 to receive an update. Input samples, both audio and data, are directed to demodulator 52 in addition to pre-filter 32. Demodulator 52 will extract the initialization vector IV from the demodulated data and signals replay block 50 along line 59 when receipt of the data packet is complete. Replay block 50 will then stop replaying old audio samples and resumes buffering of input audio samples from post-filter 36. Demodulator 52 will pass initialization vector IV to timing delay block 54 where it is passed to sweep routine 42 using a fixed delay to ensure that the sweep is re-seeded at the proper time.

FIG. 2 therefore illustrates an apparatus that will send the combined audio/synchronization data through a scrambler to a buffer that will determine what goes to the output sampler 40. The sweep routine 42 will decide when a check should be made for synchronization data. Because it is synchronized to the transmitter, it will know when the digital synchronization data packets should be present and therefore send a request update which will open a parallel signal path for the audio/synchronization data through demodulator 52 and at the same time notify replay device 50 that it should be ready to start replaying stored or buffered past audio samples. Demodulator 52 will instruct replay block 50 when the synchronization data portion of the signal is complete and replay block will stop replaying past audio samples and begin at that moment passing current descrambled audio samples to the output sample device 40.

In FIG. 1, the transmitter circuit is sending updates at some known time. This time is determined by sweep routine 26 and is also known at the receiver sweep routine 42. The receiver will receive the updates sometime later than the transmitter but on the same intervals.

Figure 3:
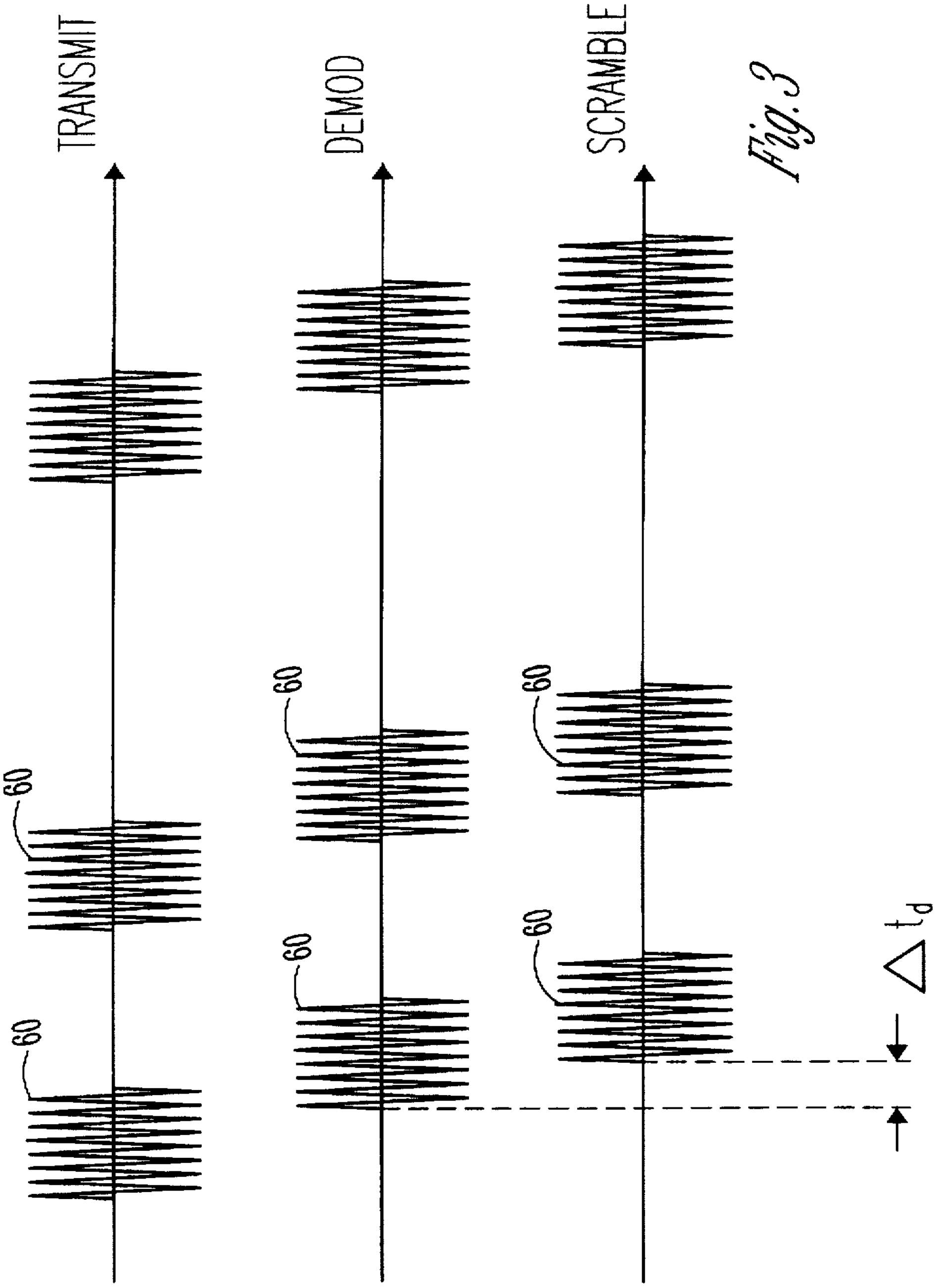
FIG. 3 is a set of schematic diagrams of signals as they may exist at various points in the apparatus of FIGS. 1 and 2.

FIG. 3 shows how the data pulses 60 will look at various points in the systems. The key is that demodulator 52 sees data pulses 60 before scrambler 34 (see offset $\Delta t_d$ in FIG. 3). Demodulator 52 instructs replay block 50 when the data pulse 60 is complete. Replay block 50 will then wait a fixed amount of time ($\Delta t_d$) before stopping the replay of past audio samples. The start of the replay has the same amount of delay but is signaled from sweep routine 42.

The included preferred embodiment is given by way of example only and not by way of limitation to the invention which is solely described by the claims herein. Variations obvious to one skilled in the art will be included within the invention defined by the claims.

What is claimed is:

1. An apparatus to continuously scramble and descramble audio while transmitting and receiving, including times of synchronization data, the apparatus including a scrambling component between an input device and an output device for connection to a radio signal transceiver device, a control device connected to the scrambling component, the control device including a section to control scrambling of the audio signal according to an algorithm and a section which issues data bursts including synchronization and scrambling for transmission to receivers, the improvement comprising:

- a switching device having first and second inputs and an output connected to the output device;
- the scrambling component connected to the first input of the switching device;
- a modulator connected between the control device and the second input of the switching device;
- a control line connected between the control device and the switching device;
- the control device including a section that issues an instruction to the switching device to interrupt any signal to the output device and to transmit the data bursts from the control device while continuously conducting scrambling in the scrambling component.

2. The apparatus of claim 1 wherein the pseudo random algorithm is a time dependent scrambling method.

3. The apparatus of claim 1 wherein the transmitter and receiver must in each instance be following the same time dependent algorithm.

4. The apparatus of claim 1 wherein the control device comprises a digital signal processor.

5. The apparatus of claim 1 wherein the digital signal processor and scrambling algorithm utilize a sweep routine.

6. The apparatus of claim 5 wherein the sweep routine generates a numerically controlled oscillator.

7. The apparatus of claim 5 wherein the switching device is controlled by the sweep routine.

8. The apparatus of claim 5 wherein the modulator is controlled by the sweep routine.

9. The apparatus of claim 1 wherein the scrambling algorithm is a frequency inversion scrambling method.

10. The apparatus of claim 9 wherein the scrambling component operates in association with the frequency inversion scrambling method.

11. The apparatus of claim 1 further comprising a pre-filter device inserted before the scrambling component and being dependent on the method of scrambling.

12. The apparatus of claim 1 further comprising a post-filter after the scrambling component to reduce the effects of the scrambling.

13. The apparatus of claim 1 wherein the input device is a sampling device operating at a sampling frequency.

14. The apparatus of claim 13 wherein the scrambling device operates at the sampling frequency.

15. The apparatus of claim 13 wherein the output device operates at the sampling frequency.

16. The apparatus of claim 1 further comprising a demodulator and a storage buffer to demodulate synchronization data, store past audio samples, and replay past audio samples during the synchronization data.

17. The apparatus of claim 16 further comprising a timer delay device to correlate timing of the buffer device replay to the synchronization data.

18. An apparatus to continuously scramble and descramble audio while transmitting and receiving, including times of synchronization data, comprising:

- an input device to sample an analog audio wave form and issue a digitized audio signal;
- a scrambling component to scramble the digitized audio signal according to a scrambling technique of a control device connected to the scrambling component;
- a modulator connected to the control device to modulate the synchronization data during a synchronization period;
- a switching device connected to the scrambling component and the modulator, the switching device having a first state which passes to an output device a scrambled digitized audio signal, and having a second state which passes to the output device modulated synchronization data,
- a control line from the control device to the switching device to place the switching device in the second state during the synchronization period, and in the first state at other times, so that the output device issues an output signal consisting of alternating periods of digitized scrambled audio and digitized modulated synchronization data, but allowing scrambling of the audio input on a continuous basis.

19. The apparatus of claim 18 further comprising a pre-filter device inserted before the scrambling component and being dependent on the method of scrambling and a post-filter component inserted after the scrambling component.

20. The apparatus of claim 18 wherein the pseudo random algorithm is a time dependent scrambling method.

21. The apparatus of claim 18 further comprising:

- an input device to sample a received analog audio and/or modulated synchronization wave form and issue a digitized audio/data signal;
- a scrambling component to scramble the digitized audio/data signal according to a scrambling technique of a control device connected to the scrambling component;
- a demodulator to demodulate the synchronization data during a synchronization period;
- a switching device connected to the input device and the modulator, the switching device having a first state which passes the audio/data signal to the scrambling component, and having a second state which passes the audio/data signal to the to the scrambling component and to the demodulator, a buffer component connected to the scrambling component which receives scrambled audio/data signal and temporarily stores digitized values of the audio portion of the audio/data signal;

a control line from the control device to the switching device to place the switching device in the second state during the synchronization period, and from the control device to the demodulator to cause demodulation of the data signal during the synchronization period, and from the control device to the buffer component to cause the buffer component to replay prior audio during the synchronization period.

22. The apparatus of claim 21 further comprising a pre-filter device inserted before the scrambling component and being dependent on the method of scrambling and a post-filter component inserted after the scrambling component.

23. The apparatus of claim 21 wherein the pseudo random algorithm is a time dependent scrambling method.

24. The apparatus of claim 21 further comprising a timer delay device to correlate timing of the buffer device replay to the synchronization data.

25. A method of continuously scrambling and descrambling audio while transmitting and receiving, including times of synchronization data, comprising:

inputting to a signal path a signal comprising one of either sampled audio or a sampled audio with periodic digital synchronization data;

in the case of a signal of sampled audio, continuously scrambling the sampled audio according to a time dependent scrambling method and sending the scrambled sampled audio to an output on the signal path, and periodically according to a control signal interrupting the scrambled sampled audio on the signal path and inserting digital synchronization data to the output on the signal path, but continuing scrambling of the sampled audio so that at the end of each insertion of digital synchronization data scrambled sampled audio correlated to the time dependent scrambling method will be sent to the output on the signal path;

in the case of a signal of sampled audio with periodic synchronization data, in a first signal path continuously descrambling the sampled audio and periodic synchronization data according to a time dependent scrambling method and sequentially storing the scrambled sample audio, periodically according to a control signal sending the scrambled audio and synchronization data to a separate signal path, separating the synchronization data from the audio, and using the synchronization data to synchronize operation of the scrambling, during the separation of the synchronization data, replaying the contents of the stored audio in a manner so that essentially no data is sent to output on the first signal path, but during the periodic digital synchronization data, descrambled audio is replayed from storage instead of having gaps in the output and when the replayed audio is discontinued, new descrambled audio, correlated with the time dependent scrambling method is sent to output.

26. A method of continuously scrambling and descrambling audio according to a time dependent scrambling method while transmitting and receiving, including times of synchronization data, comprising:

periodically interrupting scrambling of a sampled audio signal for a time period t during transmission of the scrambled audio to replace a commensurate portion of the signal with digital synchronization data;

during each time period t of interruption of the scrambled audio transmission, continuing scrambling of any further sampled audio to maintain synchronization with the time dependent scrambling method;

after each time period t, reestablishing the scrambled sampled audio signal which remains synchronized with the time dependent scrambling method because all the sampled audio is continued to be scrambled during each time period t;

periodically checking for the presence of synchronization data in received transmissions of signals contained scrambled audio and periodic synchronization data;

at times other than each periodic check, continuously descrambling audio correlated in time with the time dependent scrambling method and sending it to an output for processing into received descrambled audio;

during each periodic check, replaying stored descrambled audio and sending it to the output for processing into received descrambled audio and extracting the synchronization data to synchronize the time dependent scrambling method.

27. The method of claim 26 further comprising sending the received transmission in parallel signal paths;

in one parallel signal path continuously descrambling audio and storing discrete sequential portions;

in the other parallel signal path removing the synchronization data to synchronize the time dependent scrambling method.

* * * * *

UNITED STATES PATENT AND TRADEMARK OFFICE

CERTIFICATE OF CORRECTION

PATENT NO. : 5,768,374
DATED : June 16, 1998
INVENTOR(S) : Steven P. Poulsen

It is certified that error appears in the above-identified patent and that said Letters Patent is hereby corrected as shown below:

Claim 21, column 9, line 2, please delete the first "to the".

Signed and Sealed this

Eighth Day of September, 1998

Attest:

BRUCE LEHMAN

Attesting Officer

*Commissioner of Patents and Trademarks*